(12) United States Patent
Iwamoto

(10) Patent No.: US 9,489,770 B2
(45) Date of Patent: Nov. 8, 2016

(54) METHOD FOR GENERATING QUARTIC BEZIER TRIANGLE PATCHES FROM TRIANGLE MESH FOR COMPUTER GRAPHICS

(71) Applicant: Tatsuya Iwamoto, Bellevue, WA (US)

(72) Inventor: Tatsuya Iwamoto, Bellevue, WA (US)

(73) Assignee: Tatsuya Iwamoto, Foster City, CA (US)

( * ) Notice: Subject to any disclaimer, the term of this patent is extended or adjusted under 35 U.S.C. 154(b) by 236 days.

(21) Appl. No.: 14/287,156

(22) Filed: May 26, 2014

(65) Prior Publication Data

US 2015/0339849 A1 Nov. 26, 2015

(51) Int. Cl.
- *G06T 17/20* (2006.01)
- *G06T 17/10* (2006.01)
- *G06T 1/20* (2006.01)
- *G06T 17/30* (2006.01)

(52) U.S. Cl.
CPC ............ *G06T 17/10* (2013.01); *G06T 1/20* (2013.01); *G06T 17/30* (2013.01)

(58) Field of Classification Search
CPC ..................................................... G06T 17/20
See application file for complete search history.

(56) References Cited

U.S. PATENT DOCUMENTS

| | | | | |
|---|---|---|---|---|
| 6,549,205 B1* | 4/2003 | Horii | ............. | G06T 13/80 345/442 |
| 6,714,900 B1* | 3/2004 | Busse | ............. | G06T 17/20 703/1 |
| 8,355,020 B1* | 1/2013 | Hanau | ............. | G06T 17/10 345/419 |
| 2002/0005856 A1* | 1/2002 | Sasaki | ............. | G06T 17/20 345/606 |
| 2004/0075655 A1* | 4/2004 | Dunnett | ............. | G06T 17/20 345/418 |
| 2004/0161141 A1* | 8/2004 | Dewaele | ............. | G06K 9/3208 382/132 |
| 2005/0243102 A1* | 11/2005 | Liepa | ............. | G06T 17/20 345/611 |
| 2007/0018987 A1* | 1/2007 | Setoguchi | ............. | G06T 17/00 345/441 |
| 2009/0231334 A1* | 9/2009 | Chen | ............. | G06T 17/205 345/420 |

OTHER PUBLICATIONS

Vlachos et al., "Curved PN Triangles", 2001, I3D '2001, pp. 159-166.*
Razdan et al., "Curvature estimation scheme for triangle meshes using biquadratic Bezier patches", 2005, Computer-Aided Design 37 (2005), pp. 1481-1491.*
Li et al., "A new feature-preserving mesh-smoothing algorithm", 2009, Visual Computing (2009) 25, pp. 139-148.*
Zhihong et al., "Curvature estimation for meshes based on vertex normal triangles", 2011, Computer-Aided Design 43 (2011), pp. 1561-1566.*

* cited by examiner

*Primary Examiner* — Jacinta M Crawford
*Assistant Examiner* — Phong Nguyen

(57) ABSTRACT

Method for generating curved surface consisting of quartic Bezier triangles patches, from a mesh of planar triangles is disclosed. Mesh of planar triangles is used as input. For each vertices, faces that are joined at the vertex are evaluated to determine the desired surface orientation and a scalar parameter that describes the curvature. This can be expressed as a normal vector with its size representing the scalar parameter. Based on this normal vector, one cubic Bezier control point is generated on each side of triangles surrounding the vertex. Applying this to all vertices in the mesh will form cubic Bezier curve which is the boundary curve shared between the adjacent triangle patches. Once cubic Bezier boundary curves are obtained, quartic Bezier triangles patches can be generated for each triangle in the mesh.

2 Claims, 16 Drawing Sheets

METHOD FOR GENERATING QUARTIC BEZIER TRIANGLE PATCHES FROM TRIANGLE MESH FOR COMPUTER GRAPHICS

RELATED APPLICATIONS

Device, method, and system for generating per-pixel light values using texture parameters
  U.S. Pat. No. 7,733,349 B1
  Publication number U.S. Pat. No. 7,733,349 B1
  Publication type Grant
  U.S. application Ser. No. 09/265,493
  Publication date Jun. 8, 2010
  Filing date Mar. 9, 1999
  Priority date Mar. 9, 1999
  Fee status Paid
  Also published as WO2000054225A1
  Inventors David C. Tannenbaum
  Original Assignee Microsoft Corporation
Method and apparatus for the dynamic tessellation of curved surfaces
  U.S. Pat. No. 5,261,029 A
  Publication number U.S. Pat. No. 5,261,029 A
  Publication type Grant
  U.S. application Ser. No. 07/929,819
  Publication date Nov. 9, 1993
  Filing date Aug. 14, 1992
  Priority date Aug. 14, 1992
  Fee status Paid
  Inventors Salim S. Abi-Ezzi, Leon A. Shirman
  Original Assignee Sun Microsystems, Inc.
Curved surface generating method and apparatus therefor
  U.S. Pat. No. 5,621,872 A
  Publication number U.S. Pat. No. 5,621,872 A
  Publication type Grant
  U.S. application Ser. No. 07/848,135
  Publication date Apr. 15, 1997
  Filing date Mar. 9, 1992
  Priority date Mar. 8, 1991
  Fee status Lapsed
  Inventors Shinji Tokumasu, 4 More>>
  Original Assignee Hitachi, Ltd.
Subdividing geometry images in graphics hardware
  U.S. Pat. No. 8,462,159 B2
  Publication number U.S. Pat. No. 8,462,159 B2
  Publication type Grant
  U.S. application Ser. No. 13/533,232
  Publication date Jun. 11, 2013
  Filing date Jun. 26, 2012
  Priority date Aug. 26, 2004
  Also published as CN1741066A, 14 More>>
  Inventors Adam T. Lake, Carl S. Marshall
  Original Assignee Intel Corporation
Method of shading a graphics image
  U.S. Pat. No. 5,142,617 A
  Publication number U.S. Pat. No. 5,142,617 A
  Publication type Grant
  U.S. application Ser. No. 07/263,294
  Publication date Aug. 25, 1992
  Filing date Oct. 27, 1988
  Priority date Oct. 27, 1988
  Fee status Lapsed
  Also published as DE68927471 D1, DE68927471 T2, EP0366463A2, EP0366463A3, EP0366463B1
  Inventors John C. Dalrymple, V. B. Sureshkumar
  Original Assignee Tektronix, Inc.
Method for interpolating smooth free-form surfaces into curve mesh including composite curves
  U.S. Pat. No. 5,619,625 A
  Publication number U.S. Pat. No. 5,619,625 A
  Publication type Grant
  U.S. application Ser. No. 08/250,451
  Publication date Apr. 8, 1997
  Filing date May 27, 1994
  Priority date May 28, 1993
  Fee status Paid
  Inventors Kouichi Konno, Hiroaki Chiyokura
  Original Assignee Ricoh Company, Ltd.
  Export Citation BiBTeX, EndNote, RefMan
CAD system and bezier-curve data converting apparatus and method thereof in said CAD system
  U.S. Pat. No. 5,717,905 A
  Publication number U.S. Pat. No. 5,717,905 A
  Publication type Grant
  U.S. application Ser. No. 08/571,998
  Publication date Feb. 10, 1998
  Filing date Dec. 14, 1995
  Priority date Dec. 15, 1994
  Fee status Lapsed
  Inventors Hiroshi Iwamoto, Naohide Nishimine
  Original Assignee Kao Corporation

OTHER PUBLICATIONS

Yi Su, A. Senthil Kumar
Generalized Surface Interpolation for Triangle Meshes with Feature Retention
http://www.cadanda.com/V2Nos1to4_21.pdf
Yingbin Liu, Stephen Mann
Parametric Triangular Bezier Surface Interpolation with Approximate Continuity
http://citeseerx.ist.psu.edu/viewdoc/download?rep=rep1&type=pdf&doi=10.1.1.218.8333
Gerald Farin
Curves and Surfaces for CAGD, Fifth Edition: A Practical Guide
ISBN-13: 978-1558607378
Bui Tuong Phong
Illumination for computer generated pictures,
Communications of ACM 18 (1975), no. 6, 311-317.
Foley, James D.; van Dam, Andries; Feiner, Steven K.; Hughes, John F
Computer Graphics: Principles and Practice. (2nd ed. in C)
ISBN 0-201-84840-6

TECHNICAL FIELD

Briefly, and in general terms, this disclosure relates to a computer-implemented method and apparatus for computer graphics or computer assisted geometric design. And more particularly, to the generation of curved surface from planar triangle mesh in a computer graphics system, using Quartic Bezier triangle patches as primitives constituting the curved surface.

BACKGROUND

One of the challenges in computer graphics is modeling shapes as data format that can represent smooth curved surfaces. Computer graphics hardware naturally requires shapes to be decomposed into planar (flat) triangles. Resulting triangles need to be small enough that each triangles are no longer visible as planar.

Commonly used data formats to describe curved surfaces include subdivision surfaces, NURBS, and possibly Bezier rectangle patches. They use mesh of rectangles with additional parameters to describe the curved surface.

Use of rectangles as primitive for the mesh works well for objects that have box-like shapes using a mesh with even density. It allows the mesh to flows smoothly along the curves. But it becomes difficult with more complex overall topology, as well as uneven density of detail. For example, a human head is somewhat a ball-like shape, but while many features on the face like eyes, nose have higher density of detail compared to some parts like cheek and forehead that is relatively smooth. It is difficult to keep a even density and smooth flow of rectangles. Many tools resort to allowing use of irregular polygons such as triangles or pentagons to allow maintaining an even flow and accommodating for the difference in density of details. This requires artists to be highly trained in modeling using specific placement of mesh including adding irregular polygons.

Another challenge comes in the fact that the mesh requires specifying additional parameters such as control points or degree of subdivision. And in some cases, the vertices in the mesh may not actually represent point on the surface. This is also requires the artists to be trained in understanding the effect of these additional parameters on the final resulting curves, as the effect of their placement may not be very intuitive.

The aspects of modeling curves which requires highly trained artists also make it difficult to automate using computers. Allowing automation can improve productivity in modeling shapes, which can significantly reduce cost by reducing dependency on highly skilled artists. And it may also allow artists to be more productive by focusing on modeling shapes instead of working on the mesh to have smooth flow and even details, as well as manipulating unintuitive parameters for defining curved surfaces.

Bezier triangles have not been popularly adopted as primitive for constructing curved surfaces, although there has been some publications discussing its use.

A Bezier curve is a parametric curve used in computer graphics systems to define smooth curves. Degree of Bezier corresponds to complexity of curve that can be represented. Increased degree allows to represent more complex curves. Lower degree curve can always be represented by a higher degree. Converting the lower degree curve to higher degree curve is called degree elevation.

A quadratic Bezier curve has 3 control points, including the two end points of a curve segment (FIG. 1A). Cubic Bezier curve has four (FIG. 1B), and quartic Bezier curve has five (FIG. 1C). A straight line can be considered as a first degree, or linear, Bezier segment.

De Casteljau algorithm can be used to render the exact curve derived from the Bezier control points. A parameter t ($0=<t=<1$) is used for repeating linear interpolation between each control points until a single point is derived as described in FIG. 2.

The algorithm can be expanded to represent curved surface. A Bezier triangle can parametrically represent a triangular curved surface with three corner vertices, and control points, using barycentric coordinates. Degree elevation applies to Bezier triangles as well.

A quadratic Bezier triangle has six control points, including the three corner vertices. Corner vertices and one control point are along the side of the triangle, where each side of the quadratic Bezier triangle forms a quadratic Bezier curve (FIG. 3A). A cubic Bezier triangle has 10 control points, including the corner vertices. Corner vertices and two control points are along the side of the triangle, forming a cubic Bezier curve. One additional control point resides in the center (FIG. 3B). Quartic bezier triangle has 15 control points in addition to the three corner vertices. Corner vertices and three control points are along the side forming a quartic Bezier curve, and there are control points inside, each corresponding to a vertex (FIG. 3C). A planar triangle can be considered as zero degree Bezier triangle, where the barycentric coordinates directly represents the planar coordinates on the surface. (FIG. 3D)

For Bezier triangles, De Casteljau algorithm can be used with two parameters t ($0=<t=<1$), u ($0=<t=<1$), representing the barycentric coordinates. Point on the curved surface patch can be identified as described in FIG. 4A, FIG. 4B, FIG. 4C, FIG. 4D.

Once cubic Bezier curve is obtained for the boundary curves shared between adjacent patches, there is prior art method which allows generation of quartic Bezier triangle patch. This method assures that the resulting quartic Bezier triangle are continuous has positional and tangential continuity, making it a smooth and continuous curved surface.

SUMMARY

In general, there is disclosed a method for computer graphics that enables generation of quartic Bezier triangle patches from planar triangle mesh. A triangle mesh is a series of point positions in space, where points are connected to each other with a line segment to form triangles. The method consists of three steps. First step is generating normal vectors with its size representing curvature parameter for all the vertices in the mesh. Second step is generating cubic Bezier control points to form boundary curves for all the sides of Bezier triangle patches. Third step is generating quartic Bezier triangle patches. The novelty in this disclosure is the introduction of the curvature parameter at first and second steps. Third step follows method in prior art to assure continuous curved surface.

In this disclosure, a parameter is introduced which defines the curvature at the vertex. This scalar parameter can be defined based on the formula applied to compute the quantity, and can later be remapped through a function based on certain preference of the final curvature. Normal vector can represent this parameter as the size of the vector, combined with the orientation of the surface at the vertex.

Normal vector is generated by evaluating each triangles sharing the vertex and aggregating it for all the surrounding triangles. In one embodiment, each triangles may be represented as a vector which has the orientation of the surface, and the size of the corner angle at the vertex represented as radian divided by $2\pi$. Adding together these vectors will yield normal vector. It should be understood that other possible parameterization and aggregation methods may be used to evaluate triangles and reflecting it to the resulting normal vector with curvature parameter as size.

Next, normal vector is used to identify the control points that form cubic Bezier curves along the sides of the triangle. For each vertex, one cubic Bezier control point is generated for each sides of triangles sharing the vertex. Each control points are generated as following. The control point has to be coplanar with the vertex on a plane which is perpendicular to the normal vector. The control point also has to be coplanar with the normal vector and the line segment. This constrains the position of the control point on a line in space originating from the vertex. In one embodiment, the distance between the vertex and the control point can be chosen such that the curve approximates an arc. The line segment is assumed to be the chord for the arc, and the tangent is perpendicular to the normal vector. In one embodiment, the distance can be chosen with the following formula $(2N\times(B\times N))/(3|N|(\sin\omega+\sin^2\omega))$ which allows the middle point of the cubic Bezier curve to pass through the center point of the arc. Cubic Bezier curves cannot precisely represent arcs, and simplified formulas could also reduce the amount of computation involved. Thus, other approximation formulas may be used in place of the formula is used in this embodiment.

Curvature parameter can be utilized in generating control point as-is, or can be converted by a mapping function to suit the needs of the generation of control points and preference for curvature. In one embodiment, the size of the normal vector is mapped through a quadratic formula to define the distance coefficient. Where the size of the normal has a range of $0\leq s\leq 1$, and the formula is $s'=1-(1-s)^2$. This gives the result a bias of to stay close to 1. In one embodiment, the curvature parameter of 1 means curvature approximating an arc, while 0 means s sharp point. The parameter is used to scale the distance between the vertex and the control point. Cubic Bezier control points form boundary curves along the side of triangles which serve as input to the next step in this disclosure, but it should be understood that the generation of cubic Bezier curves along the triangle sides is applicable for many other applications of triangle mesh processing. From this point, prior art method can be applied to generate quartic Bezier triangle patches.

DETAILED DESCRIPTION OF THE INVENTION

Mesh of planar triangles is used as input. A triangle mesh is a series of point positions in space (FIG. 5A), where points are connected to each other with a line segment to form triangles (FIG. 5B). Each points represent a vertex of triangles sharing the vertex. Each line segment connecting the vertices represent sides of triangles being shared between adjacent triangles sharing the vertex.

Generating normal vector for vertices in a mesh of planar triangles has a common application. Normal vectors are used for calculation of light reflection for smooth shading. Normal vectors are defined at vertices and linearly interpolated for the points inside the triangle plane. Using this normal vector allows shades to appear smooth even on planar triangles. This technique is known as Phong shading. But the shape of the triangle stays strictly planar and only the orientation of the surface is used. In this disclosure, a parameter is introduced which defines the curvature at the vertex. This scalar parameter can be defined based on the formula applied to compute the quantity, and can later be remapped through a function based on certain preference of the final curvature. Normal vector can represent this parameter as the size of the vector, combined with the orientation of the surface at the vertex.

Normal vector is generated by evaluating each triangles sharing the vertex and aggregating it for all the surrounding triangles (FIG. 6). Each triangles can be evaluates based on, but not limited to, the following criteria; surface orientation, corner angle at the vertex, length of each sides. Aggregation can be, but not limited to, the following; summation, average, weight average.

In such case as mentioned earlier, when only the orientation at the vertex is of interest, it is a common practice to use cross products for each triangles. Add the cross product for all the triangles and ignore the size. This method can be considered as a subset of a method disclosed, which has no variation in the curvature parameter.

In one embodiment, each triangle may be represented as a vector which has the orientation of the surface, and the size of the corner angle at the vertex represented as radian divided by $2\pi$ (FIG. 7A, FIG. 7B, FIG. 7C, FIG. 7D). Aggregation is done by taking a sum of this vector for all surrounding triangles. In this embodiment, when all the triangles are coplanar, the parameter would have a quantity of 1. When the triangles meet at the vertex to form a point, the quantity of the parameter gets closer to zero as the point gets sharper.

The normal vector with curvature parameter as size can serve as input to the next step in this disclosure, but it should be understood that the generation of normal vectors with curvature parameter is applicable for many other applications of triangle mesh processing.

Next, normal vector with curvature parameter is used to identify the control points that form cubic Bezier curves along the sides of the triangle. Although the previous step in this disclosure yields input desired for this step, input can be independently generated through other means, including manual operation by an artist. For each vertex, one cubic Bezier control point is generated for each sides of triangles sharing the vertex. This process is applied to all vertices in the mesh, such that all line segments connecting two vertices will have two control points. Also using two endpoints of the line segments as end control points, each line segments will form cubic Bezier curves. This cubic Bezier curve defines the boundary curve shared between the two Bezier triangle patches.

Each control points are generated as following. The control point has to be coplanar with the vertex on a plane which is perpendicular to the normal vector (FIG. 8A). The control point also has to be coplanar with the normal vector and the line segment (FIG. 8B). This constrains the position of the control point on a line in space originating from the vertex.

In one embodiment, the distance between the vertex and the control point can be chosen such that the curve approximates an arc (FIG. 9A). Only one control point is generated at a vertex for a line segment, thus only following conditions are involved; the angle between the control point and the line segment, length of the line segment. Only for the purpose of computing the control point, we assume the vertex at the other end of line segment is also part of the same arc, having a symmetric normal vector (FIG. 9B). Using the conditions above, a distance can be chosen with the following formula $(2N\times(B\times N))/(3|N|(\sin\omega+\sin^2\omega))$ which allows the middle point of the cubic Bezier curve to pass through the center point of the arc. Cubic Bezier curves cannot precisely represent arcs, and simplified formulas could also reduce the amount of computation involved. Thus, other approximation formulas can be used in place of the formula used in this embodiment.

Curvature parameter can be utilized in generating control point as-is, or can be converted by a mapping function to suit the needs of the generation of control points and preference for curvature. A global mapping function can be used to set a curvature preference for the entire data set. Alternatively, mapping function can be parameterized based on such things as mesh density, or other criteria which is external to the data set such as mesh density in screen space, screen space position, animation, etc.

In one embodiment, the size of the normal vector is mapped through a quadratic formula to define the distance coefficient. Where the size of the normal has a range of $0\leq s\leq 1$, and the formula is $s'=1-(1-s)^2$. This gives the result a bias of to stay close to 1.

In one embodiment, the curvature parameter of 1 means curvature approximating an arc, while 0 means s sharp point. The parameter is used to scale the distance between the vertex and the control point.

Cubic Bezier control points along the side of triangles serve as input to the next step in this disclosure, but it should be understood that the generation of cubic Bezier curves along the triangle sides is applicable for many other applications of triangle mesh processing.

From this point, prior art method can be applied to generate quartic Bezier triangle patches. First, cubic Bezier boundary curve is degree elevated to quartic Bezier curve. Next, internal control points are chosen while retaining G1 continuity.

DESCRIPTION OF DRAWINGS

FIG. 1: Series of diagrams illustrating Bezier curves.
FIG. 3: Series of diagrams illustrating Bezier triangles.
FIG. 4: Series of diagrams illustrating De Cateljau algorithm on cubic Bezier triangle.
FIG. 5: Series of diagrams illustrating planar triangle mesh.
FIG. 7: Series of diagrams illustrating computation of normal vector with curvature parameter.
FIG. 8: Series of diagrams illustrating the constraints for control point position.
FIG. 9: Series of diagrams illustrating computation of control point to approximate an arc.

Figure 1A:
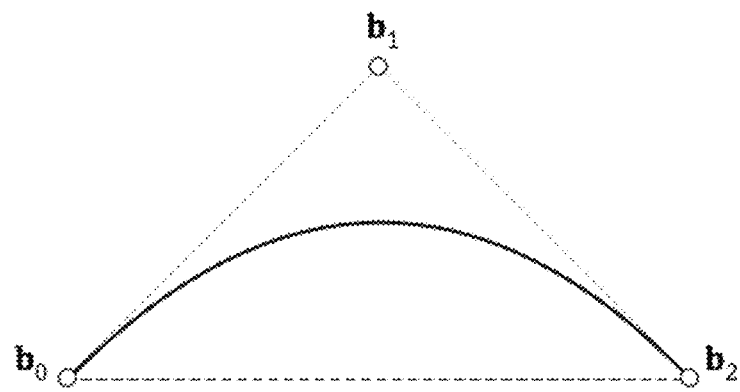
FIG. 1A: Quadratic Bezier curve.
Figure 1B:
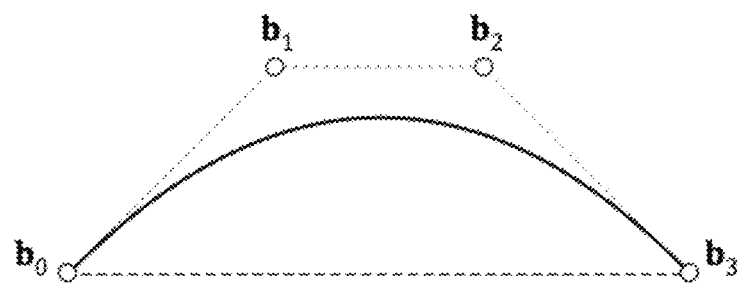
FIG. 1B: Cubic Bezier curve.
Figure 1C:
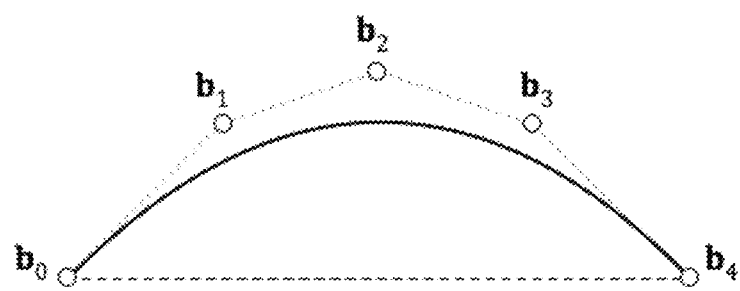
FIG. 1C: Quartic Bezier curve.
Figure 2:
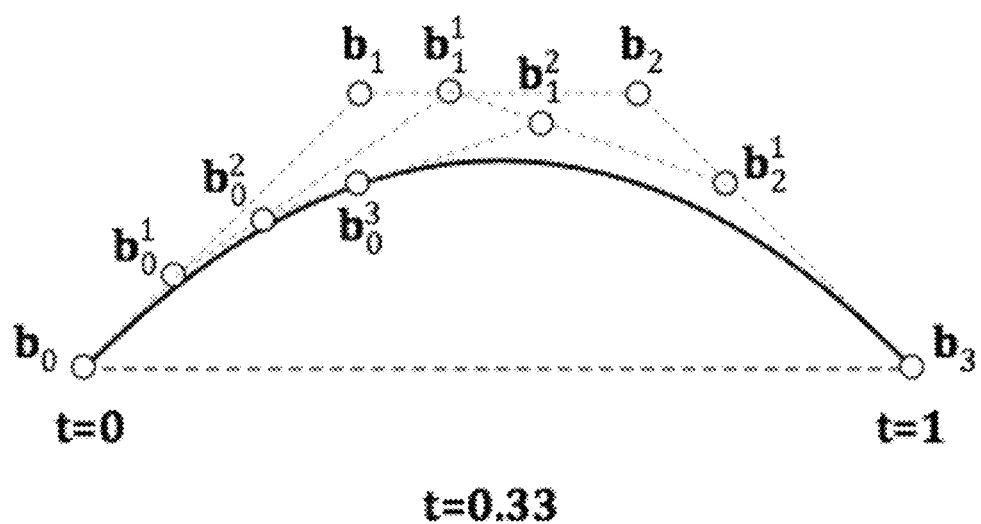
FIG. 2: De Cateljau algorithm on cubic Bezier curve.
Figure 3A:
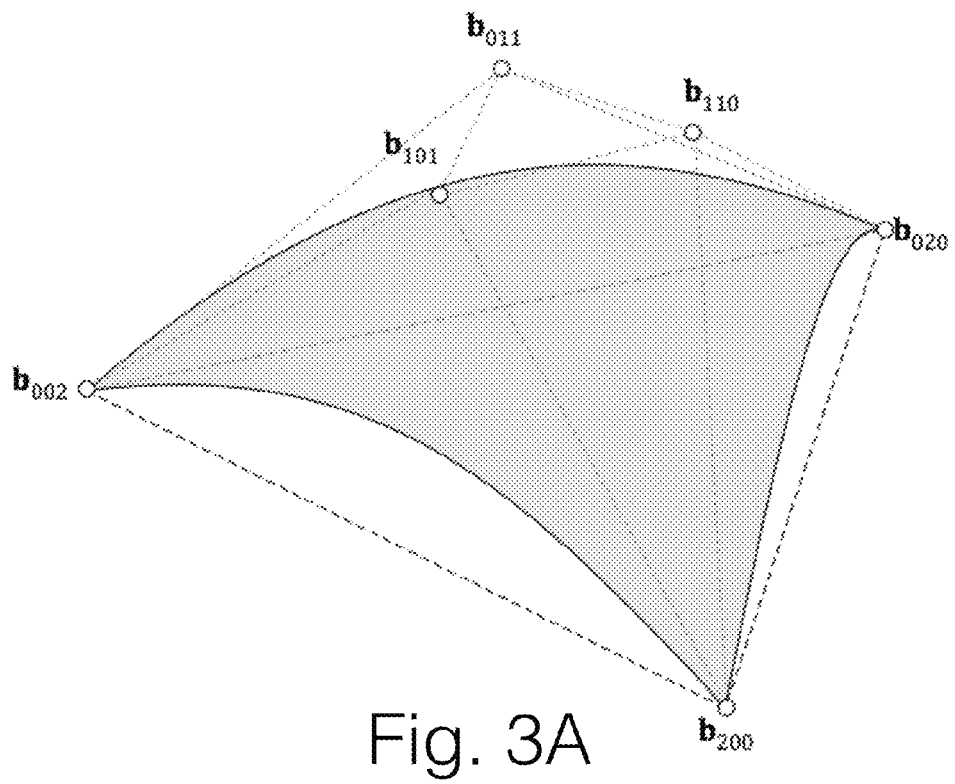
FIG. 3A: Quadratic Bezier triangle.
Figure 3B:
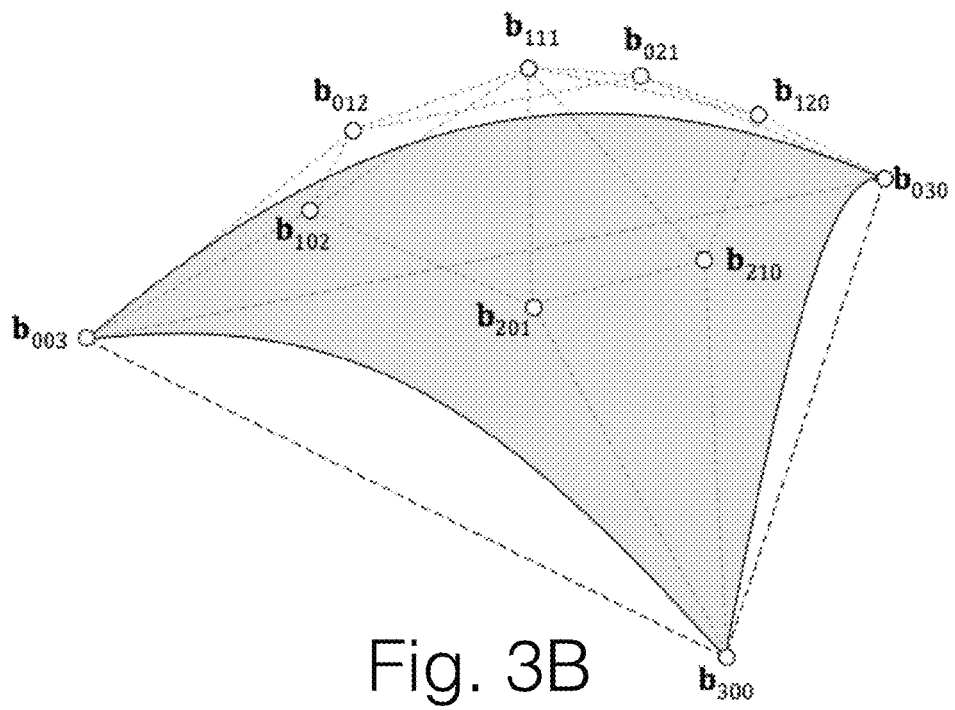
FIG. 3B: Cubic Bezier triangle.
Figure 3C:
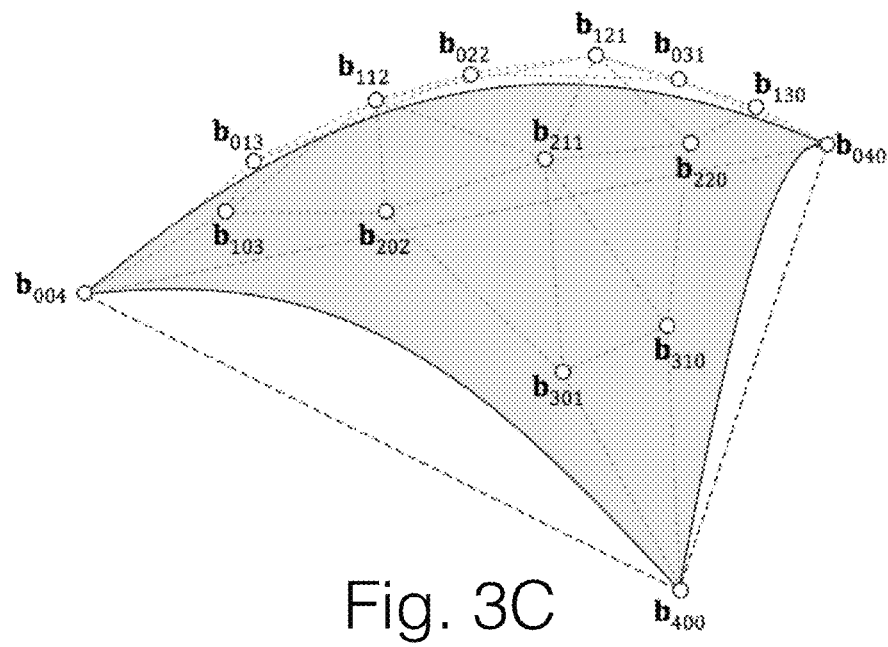
FIG. 3C: Quartic Bezier triangle.
Figure 3D:
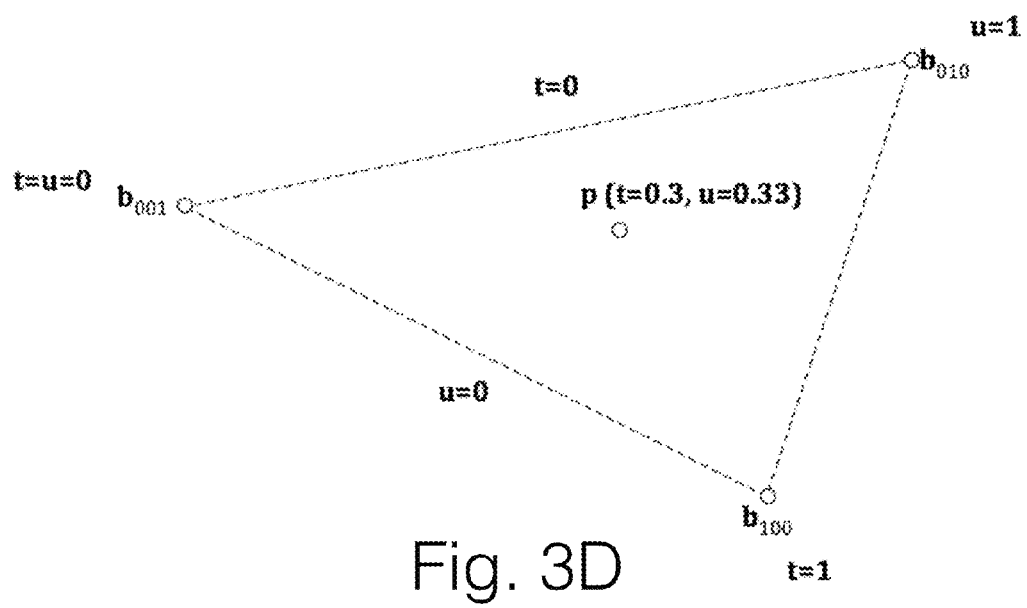
FIG. 3D: Planar triangle with barycentric coordinate.
Figure 4A:
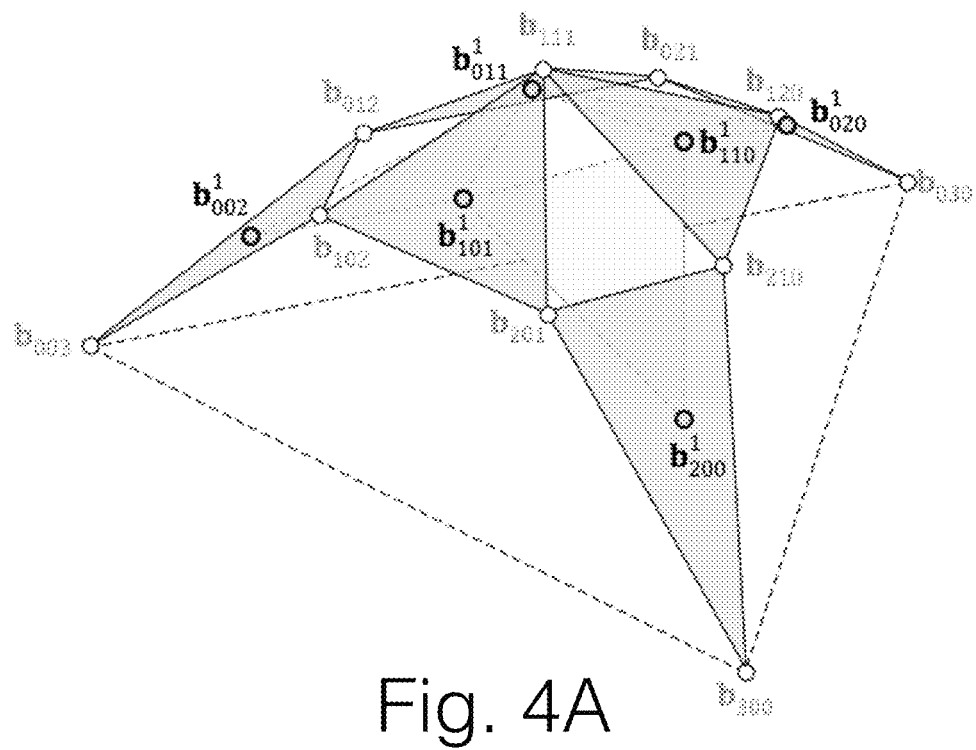
FIG. 4A: First iteration of linear interpolation on cubic Bezier triangle.
Figure 4B:
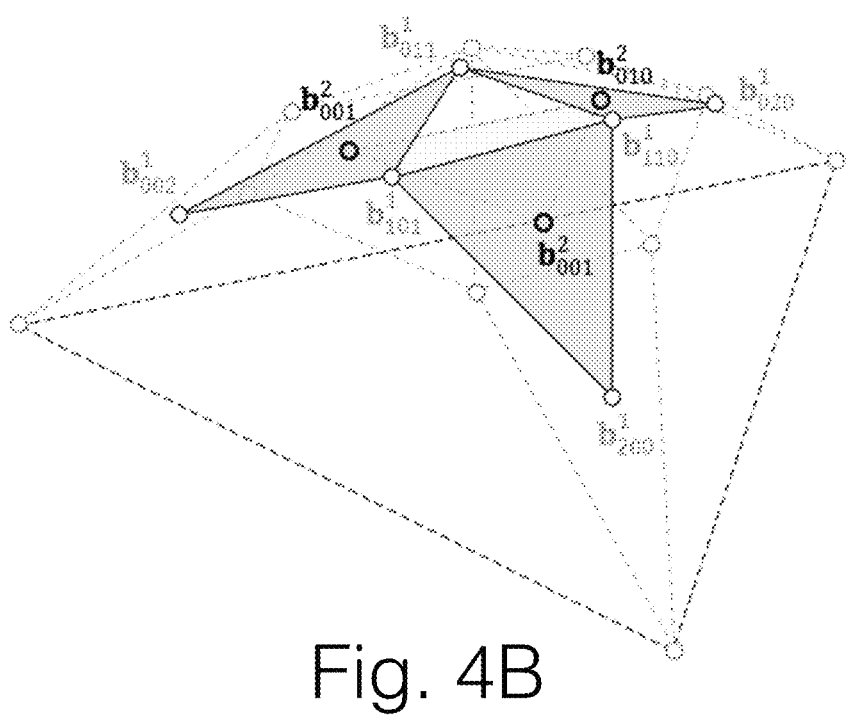
FIG. 4B: Quadratic Bezier triangle is derived from FIG. 4A for second iteration of linear interpolation.
Figure 4C:
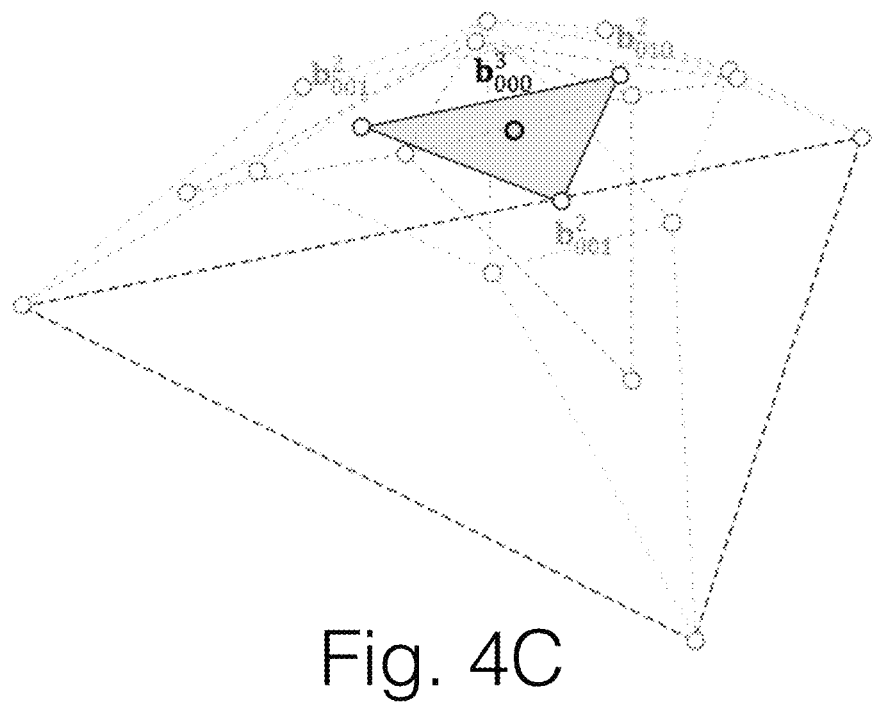
FIG. 4C: Planar triangle is derived from FIG. 4B for third iteration of linear interpolation.
Figure 4D:
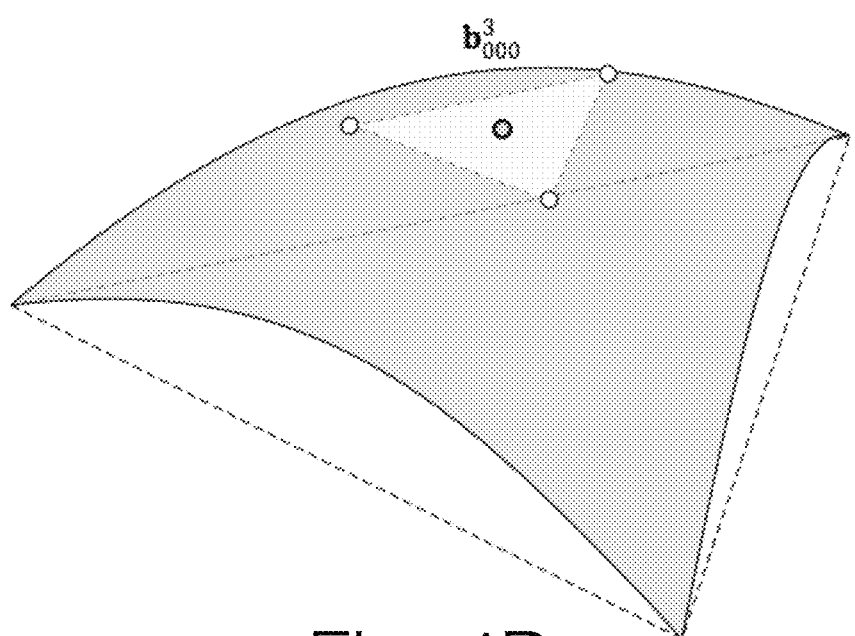
FIG. 4D: Planar triangle and resulting point shown as part of curve.
Figure 5A:
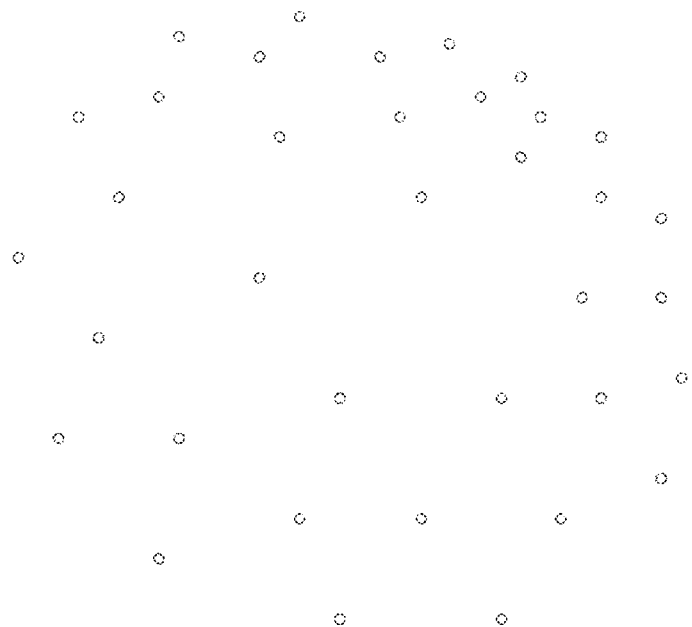
FIG. 5A: Points in space.
Figure 5B:
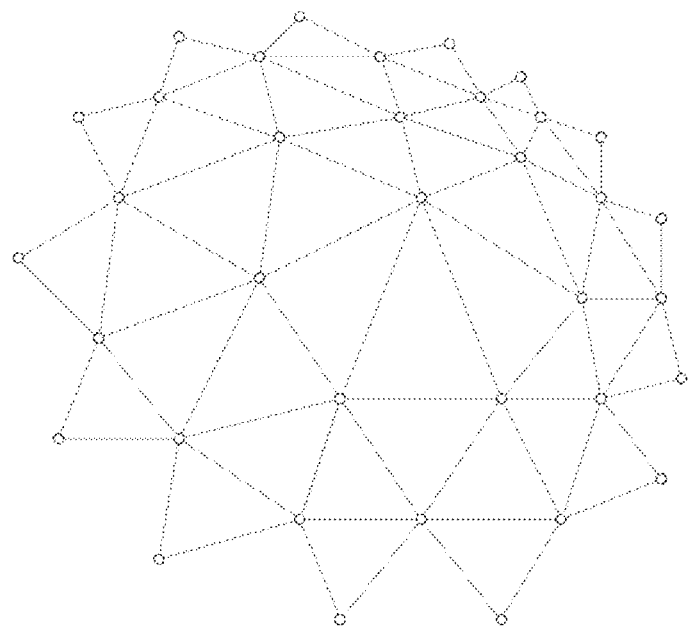
FIG. 5B: Points connected to form triangle mesh.
Figure 6:
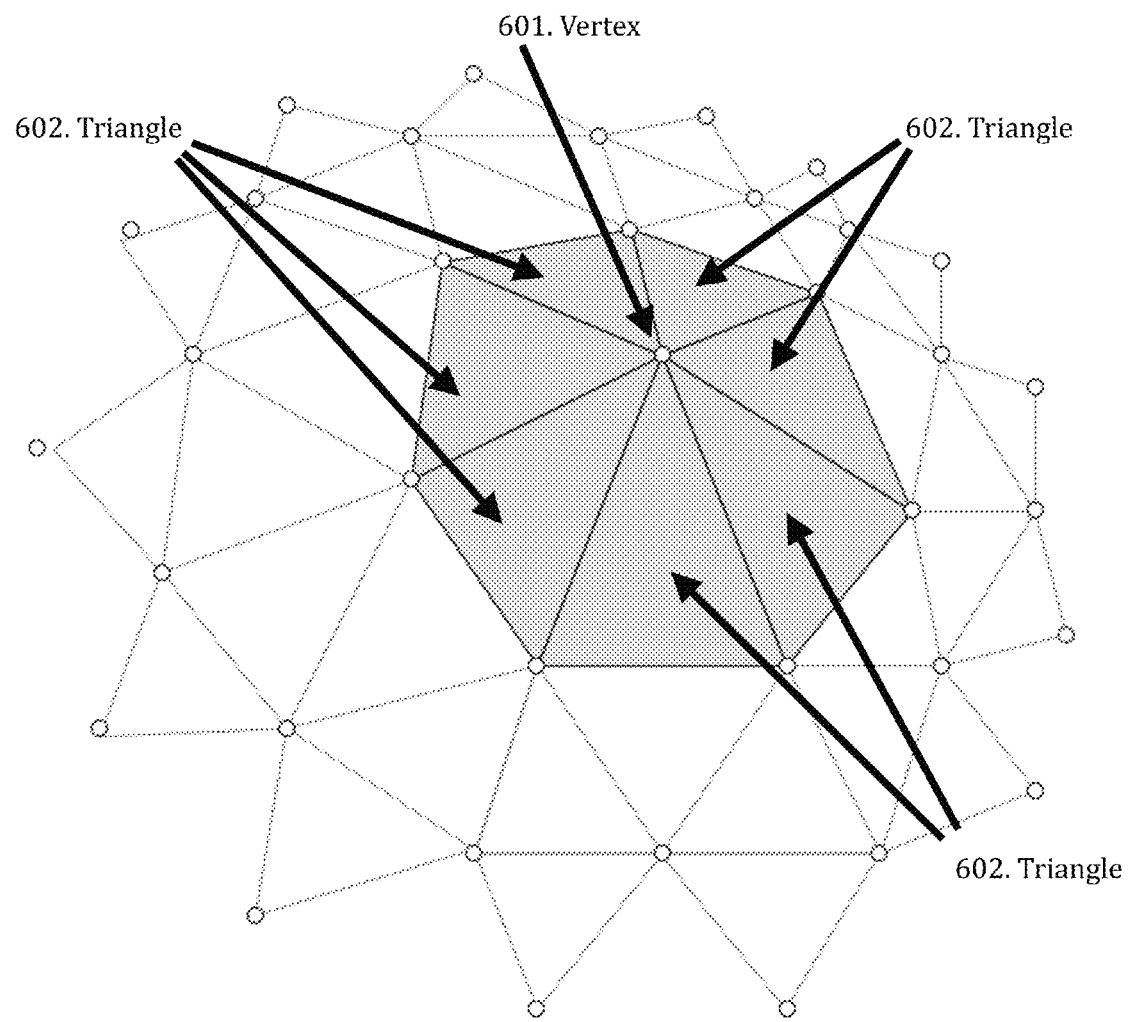
FIG. 6: Illustrating a vertex in the mesh and the triangles sharing the vertex.
Figure 7A:
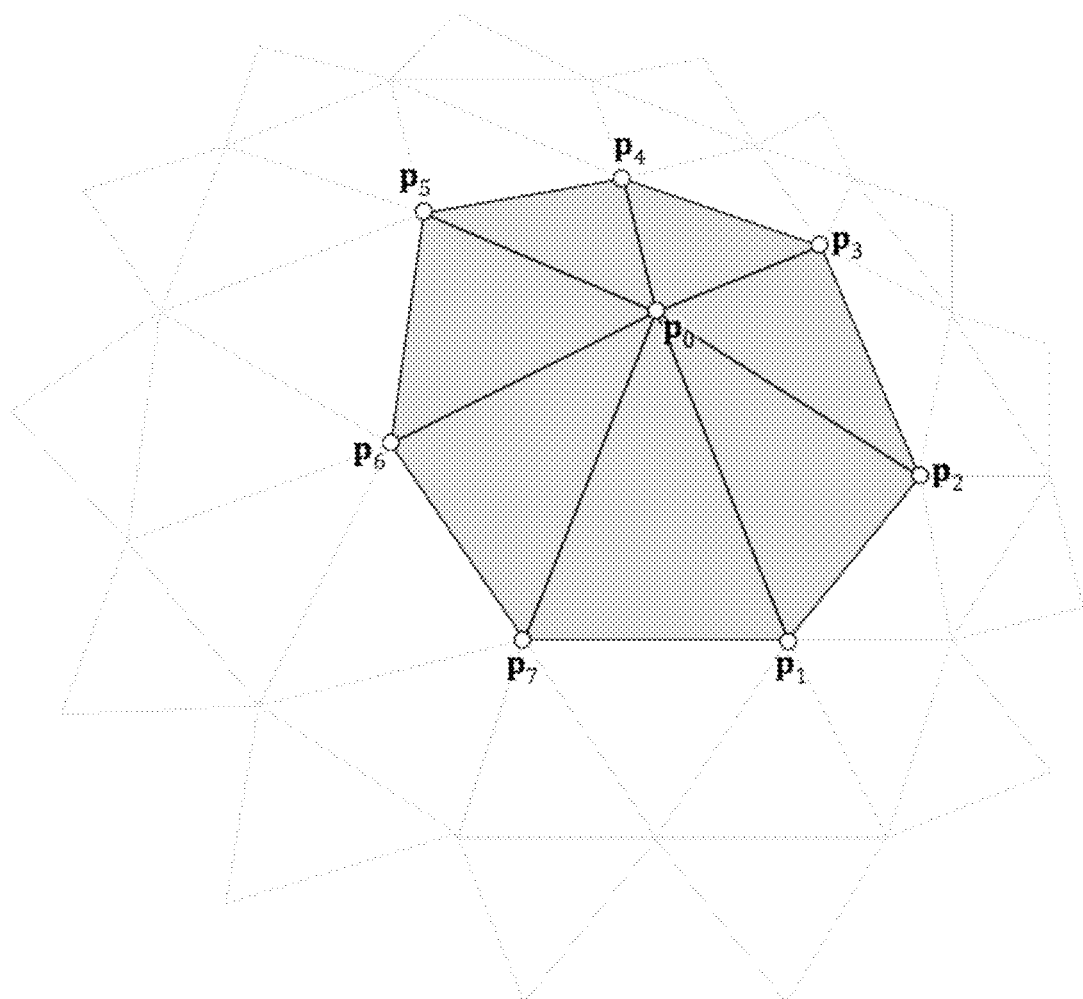
FIG. 7A: Vertex of interest and connecting vertices are named; $p_0$ and $p_1$ through $p_7$.
Figure 7B:
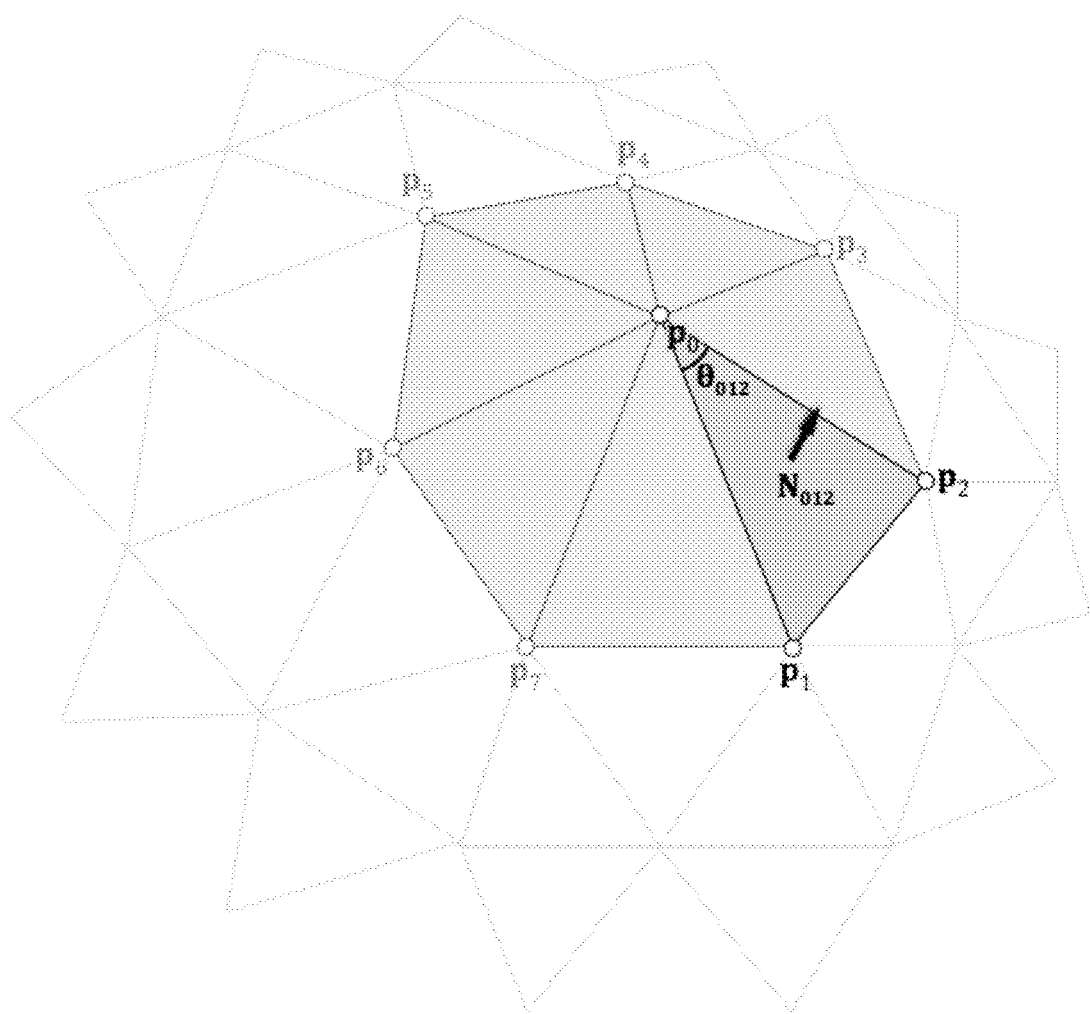
FIG. 7B: Triangle of interest $p_0 p_1 p_2$, where the corner angle at $p_0$ is $\theta_{012}$. $N_{012}$ is the surface normal vector for the triangle with size $\theta_{012}/2\pi$.
Figure 7C:
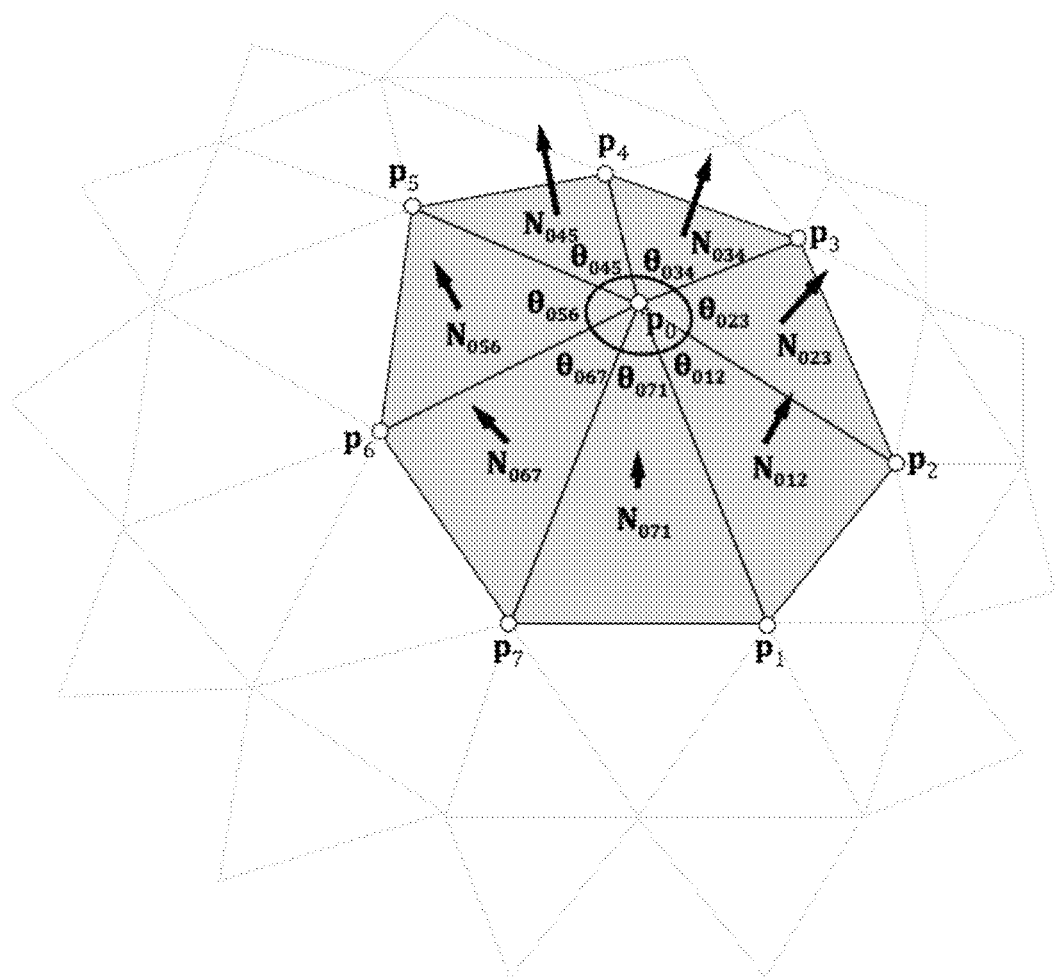
FIG. 7C: All triangles are evaluated as in FIG. 7B.
Figure 7D:
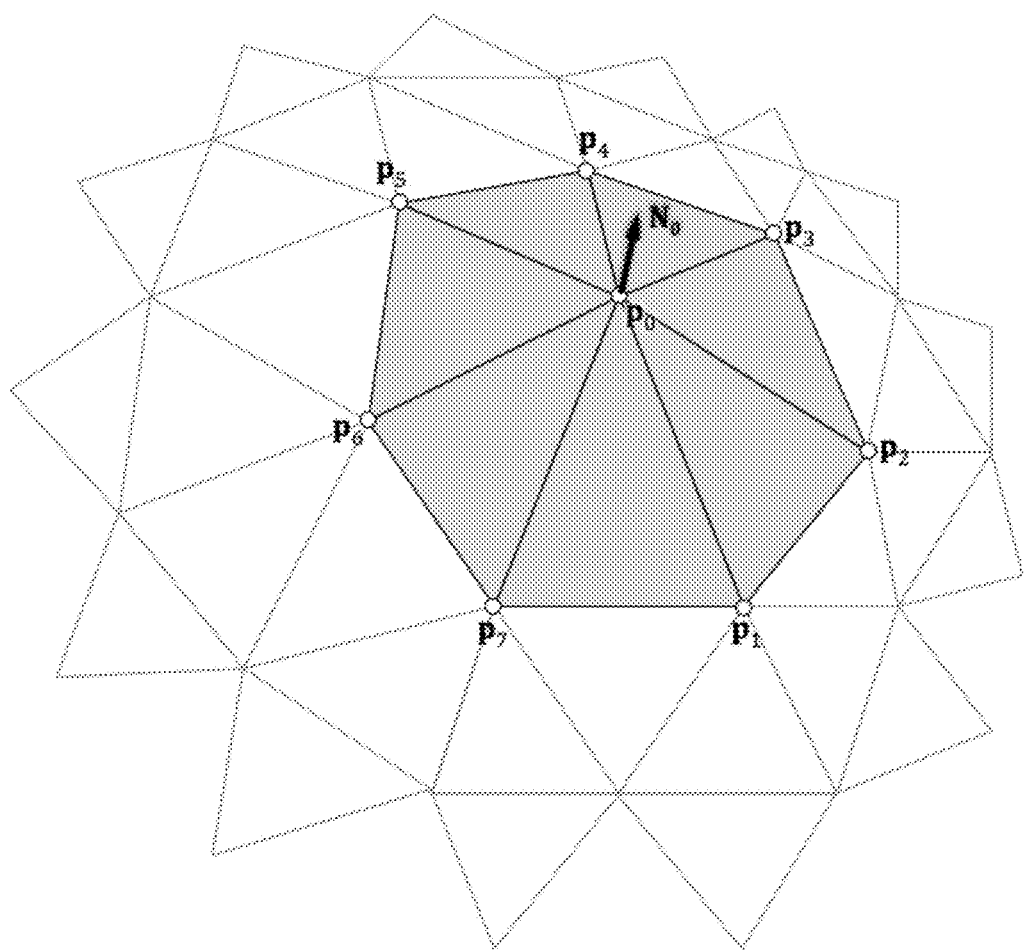
FIG. 7D: Adding all the surface normal vector yields the vertex normal vector $N_0$ for point $p_0$.
Figure 8A:
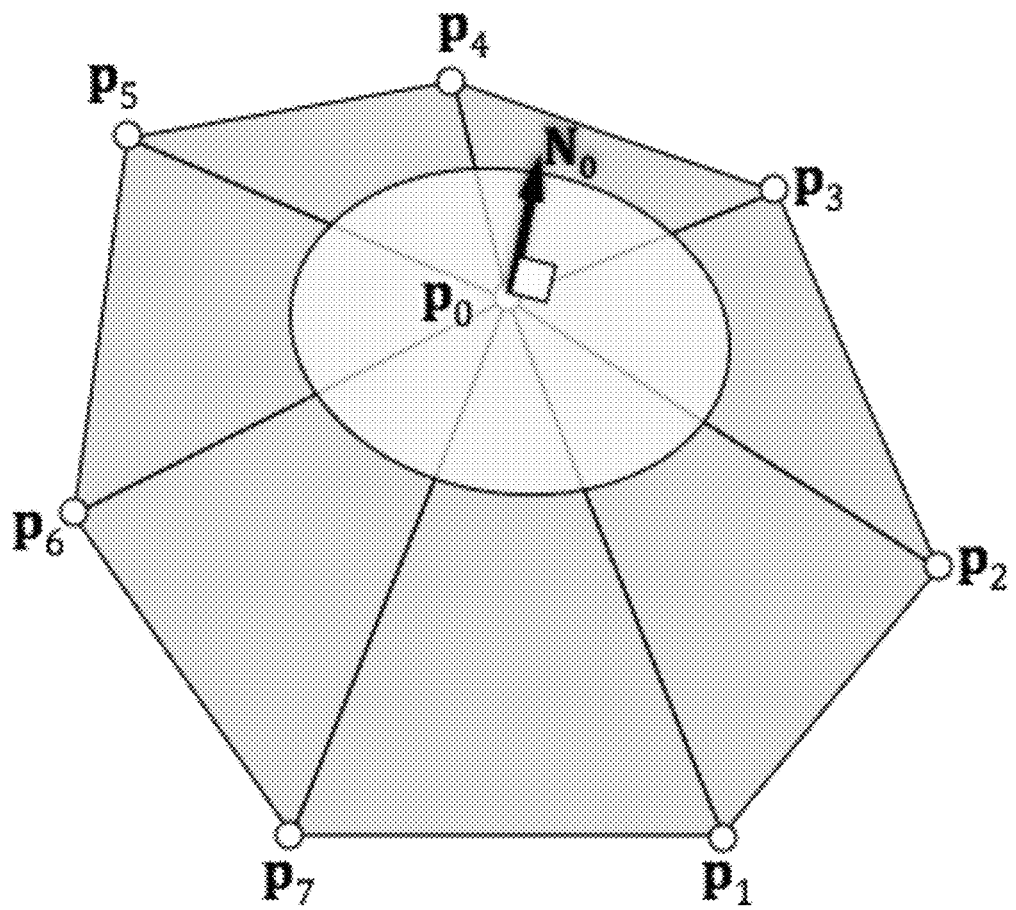
FIG. 8A: Plane including $p_0$ and perpendicular to $N_0$ constraining the position of control point.
Figure 8B:
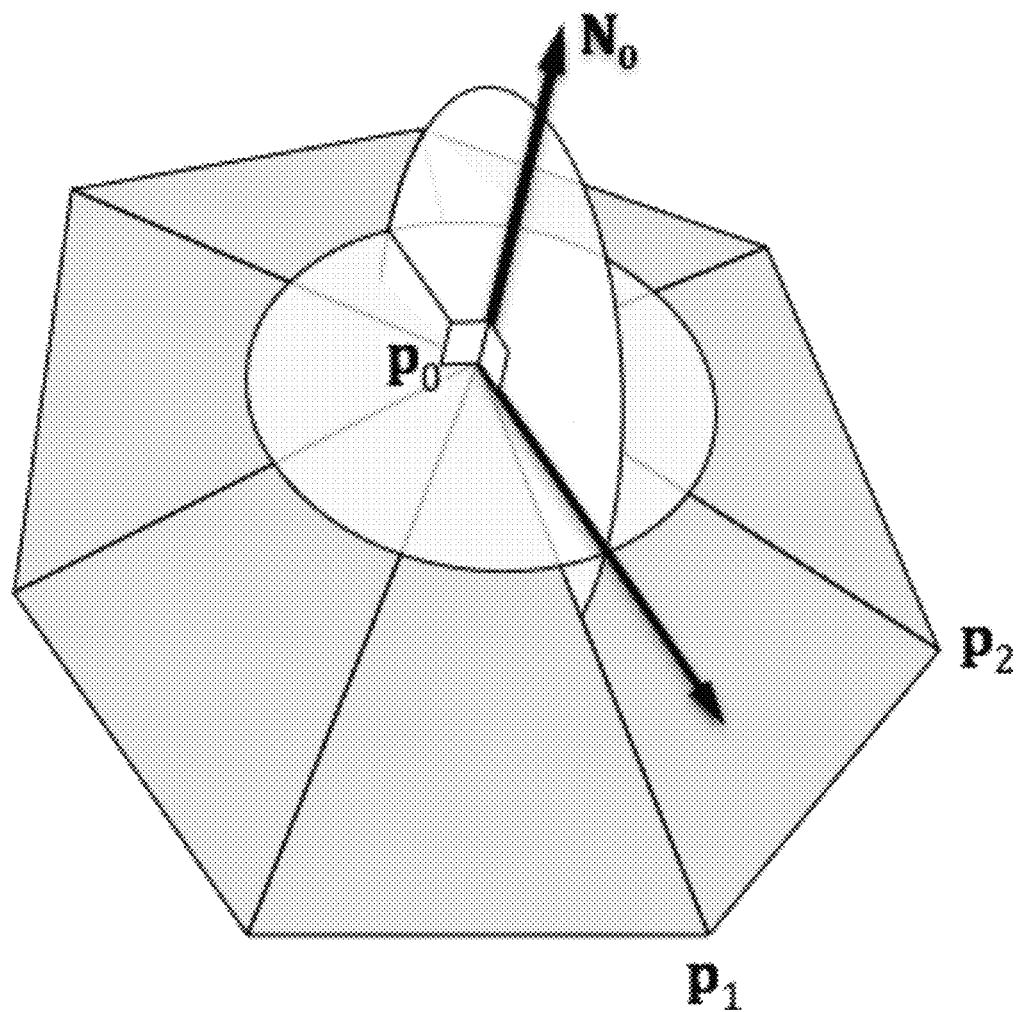
FIG. 8B: Plane coplanar to $N_0$ and $p_0 p_1$ constraining the position of control point in addition to FIG. 8A.
Figure 9A:
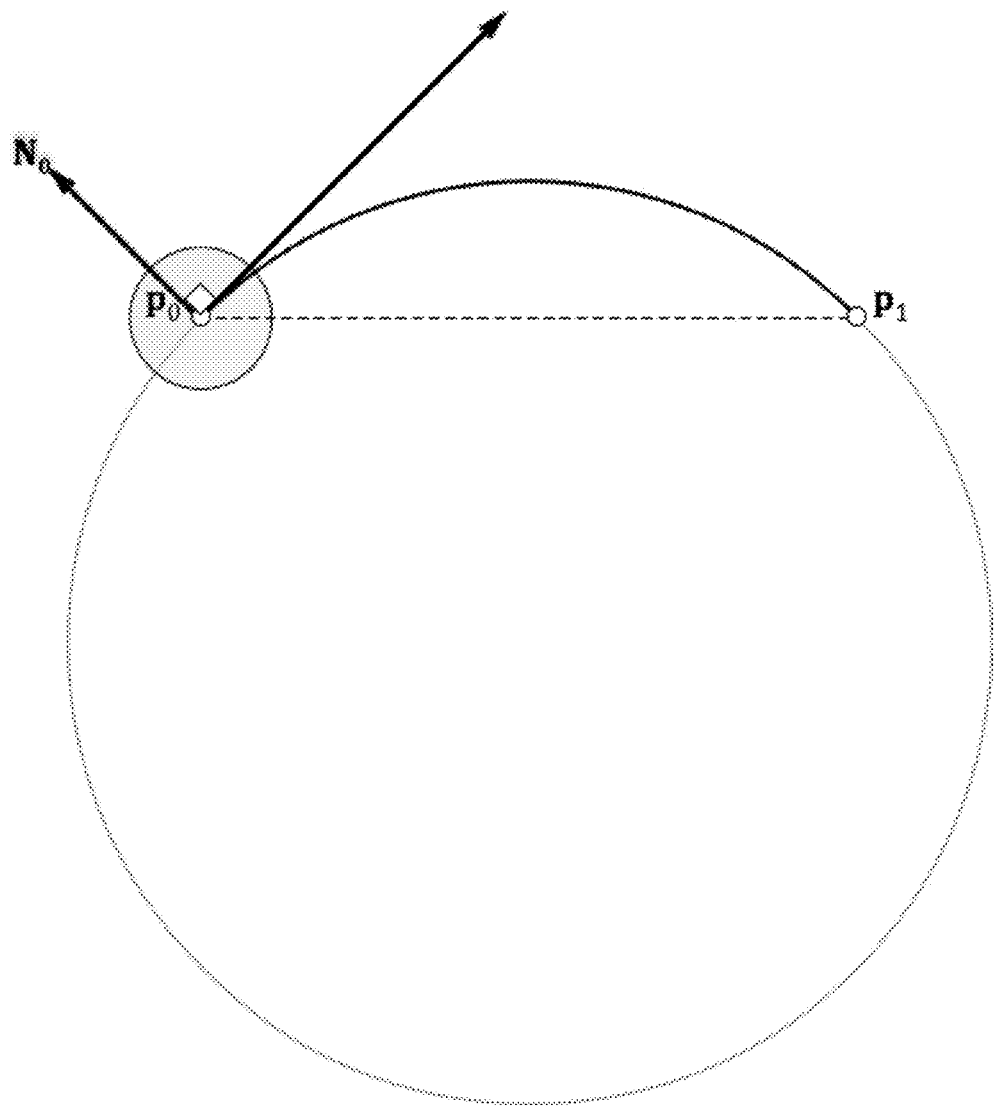
FIG. 9A: Virtual circle shown where the cubic Bezier curve should approximate the arc between $p_0$ and $p_1$, keeping constraints illustrated in FIG. 8A and FIG. 8B.
Figure 9B:
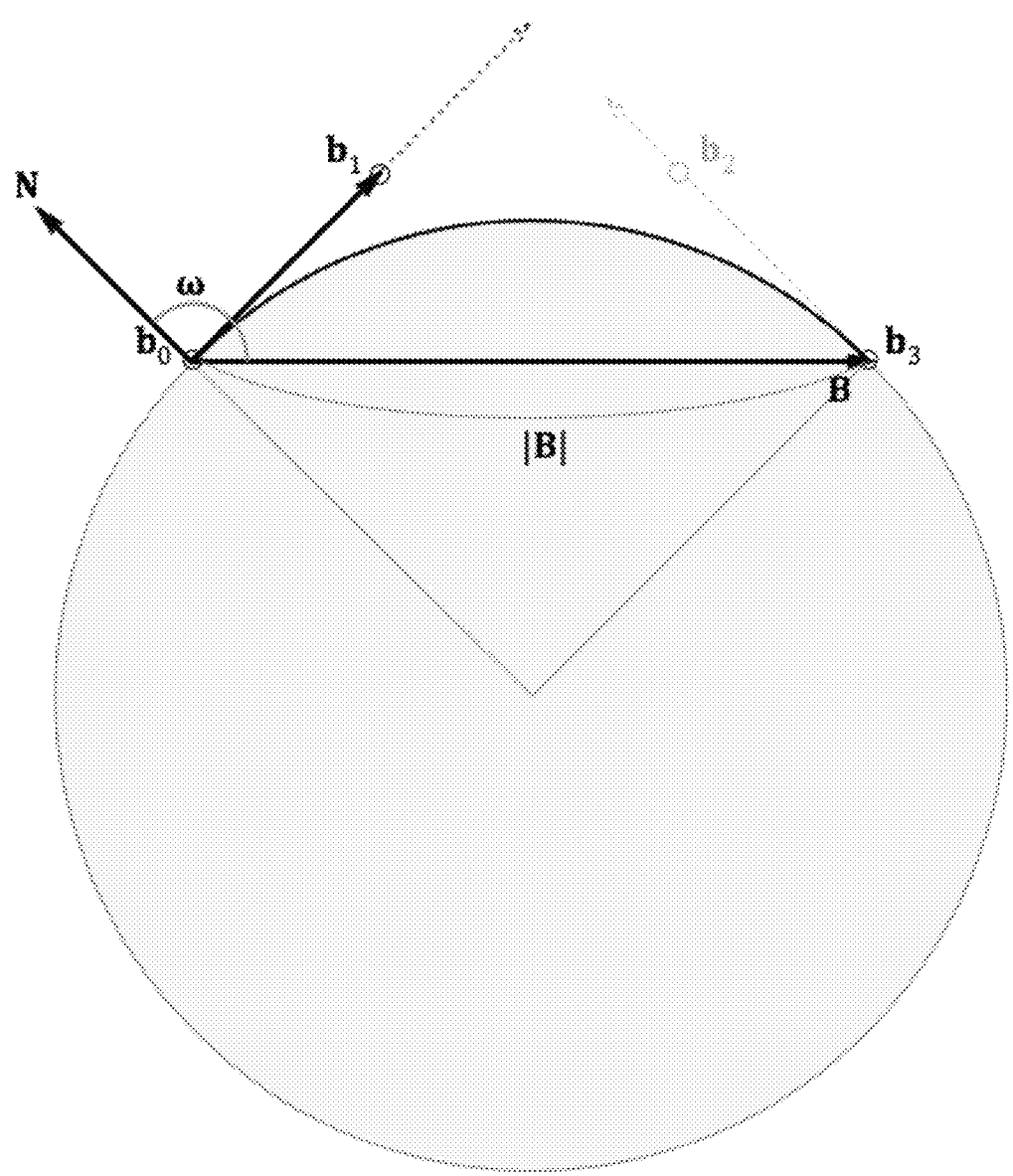
FIG. 9B: Names are replaced with those used in FIG. 1B for control points in a cubic Bezier curve. New names are introduced; N: Normal vector at point $b_0$, B=vector $b_0 b_1$, $\omega$: angle between N and B.

The invention claimed is:

1. A method of computer graphics data processing, comprising:
receiving a triangle mesh having a plurality of vertices, each vertex in the triangle mesh having a normal vector and a scalar curvature parameter which is encoded as a size of the normal vector;
constructing a curved surface that connects the plurality of vertices in the triangle mesh without modifying their positions, wherein for each line segment of the triangle mesh that connects a first vertex and a second vertex of the plurality of vertices, the method further comprising:
determining a position of a first cubic Bezier control point of the first vertex and a position of a second cubic Bezier control point of the second vertex, the position of the first and second cubic Bezier control points defining a cubic Bezier boundary curve that is part of the curved surface, wherein at least the position of the first cubic Bezier control point is based on a position of the first vertex, a position of the second vertex, a normal vector at the first vertex, and a scalar curvature parameter associated with the first vertex, and is determined by:
determining a first plane containing the first vertex and perpendicular to the normal vector at the first vertex;
determining a second plane containing the first vertex, the second vertex, and the normal vector at the first vertex;
determining an intersecting line of the first plane and the second plane;
calculating the position of the first cubic Bezier control point on the intersecting line based on an angle formed between the normal vector at the first vertex and the line segment, and also based on a distance between the first vertex and the second vertex, the distance being scaled in accordance with the scalar curvature parameter associated with the first vertex; and
generating the first cubic Bezier control point and the second cubic Bezier control point.

2. A system of computer graphics data processing, comprising:
a processor;
a memory storing computer instructions, wherein the processor executes the stored computer instructions to implement the method of claim 1.

* * * * *